(12) United States Patent
Daellenbach

(10) Patent No.: US 10,353,841 B2
(45) Date of Patent: Jul. 16, 2019

(54) OPTIMIZING ROUTING OF A SIGNAL PATH IN A SEMICONDUCTOR DEVICE

(71) Applicant: INTERNATIONAL BUSINESS MACHINES CORPORATION, Armonk, NY (US)

(72) Inventor: Lukas Daellenbach, Altdorf (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 284 days.

(21) Appl. No.: 15/372,848

(22) Filed: Dec. 8, 2016

(65) Prior Publication Data
US 2018/0165239 A1    Jun. 14, 2018

(51) Int. Cl.
G06F 7/50 (2006.01)
G06F 13/40 (2006.01)
G06F 9/50 (2006.01)

(52) U.S. Cl.
CPC ........ *G06F 13/4022* (2013.01); *G06F 9/5016* (2013.01)

(58) Field of Classification Search
CPC .................................................. G06F 17/5077
See application file for complete search history.

(56) References Cited

U.S. PATENT DOCUMENTS

| | | |
|---|---|---|
| 5,629,860 A | 5/1997 | Jones et al. |
| 6,622,291 B1 | 9/2003 | Ginetti |
| 8,370,786 B1 | 2/2013 | Burstein |
| 8,468,488 B1 * | 6/2013 | Burstein ............. G06F 17/5072 716/113 |
| 8,543,964 B2 | 9/2013 | Ge et al. |
| 8,751,996 B1 * | 6/2014 | Birch .................. G06F 17/5077 716/126 |
| 8,789,004 B2 | 7/2014 | Chen et al. |
| 9,298,872 B2 | 3/2016 | Nam et al. |
| 2002/0083398 A1 | 6/2002 | Takeyama et al. |
| 2005/0055828 A1 * | 3/2005 | Wang ................. G06F 17/5077 29/857 |

(Continued)

OTHER PUBLICATIONS

Bang et al, "Delay Uncertainty and Signal Criticality Driven Routing Channel Optimization for Advanced DRAM Products", Published in: 2016 21st Asia and South Pacific Design Automation Conference (ASP-DAC), Date of Conference: Jan. 25-28, 2016 (Year: 2016).*

(Continued)

*Primary Examiner* — Farley Abad
(74) *Attorney, Agent, or Firm* — William Kinnaman, Esq.; Kevin P. Radigan, Esq.; Heslin Rothenberg Farley & Mesiti P.C.

(57) ABSTRACT

Methods are provided for optimizing a routing of a signal path in terms of delay and signal integrity in a semiconductor device. The signal path includes at least one track in a metal layer. The method includes selecting an already routed original signal path to be optimized, modifying at least one original routing parameter, creating an alternative signal path based on the modified routing parameter value, determining at least one timing value describing the delay and signal integrity of the alternative signal path and signal integrity, and replacing the already routed original signal path by the alternative signal path based on the timing value indicating that the alternative signal path complies with predefined constraints related to the delay and signal integrity.

18 Claims, 9 Drawing Sheets

(56) References Cited

U.S. PATENT DOCUMENTS

| | | |
|---|---|---|
| 2009/0254875 A1 | 10/2009 | Mehrotra et al. |
| 2012/0151193 A1 | 6/2012 | Daellenbach et al. |
| 2014/0089880 A1 | 3/2014 | Haller et al. |
| 2014/0223397 A1 | 8/2014 | Alpert et al. |
| 2014/0331196 A1 | 11/2014 | Helvey |

OTHER PUBLICATIONS

Moffitt et al.; "Wire Synthesizable Global Routing for Timing Closure", 16th Asia and South Pacific Design Automation Conference (ASP-DAC) (Jan. 25-28, 2011) (pp. 545-550).

Wei et al., "CATALYST: Planning Layer Directives for Effective Design Closure", Design, Automation, and Test in Europe Conference & Exhibition (Mar. 18-22, 2013) (6 Pages).

Dong et al., "Delay-Driven Layer Assignment in Global Routing Under Multi-tier Interconnect Structure", Proceedings of the 2013 ACM International Symposium on Physical Design (ISPD '13), (Mar. 24-27, 2013) (pp. 101-107).

Braun et al., "Timing Based Net Constraints Tagging with Zero Wire Load Validation", U.S. Appl. No. 15/378,383, filed Dec. 14, 2016 (36 pages).

Lukas Daellenbach, "List of IBM Patents & Patent Applications Treated as Related", U.S. Appl. No. 15/372,848, filed Dec. 8, 2016, dated Jan. 5, 2017 (2 pages).

Bang et al., "Delay Uncertainty and Signal Criticality Driven Routing Channel Optimization for Advanced DRAM Products", 21st Asia & South Pacific Design Automation Conference (ASP-DAC) (2016) (pp. 697-704).

Braun et al., Office Action for U.S. Appl. No. 378,383, filed Dec. 14, 2016, dated Nov. 14, 2017 (11 pages).

\* cited by examiner

310

| metal layer | width | Δt/mm | buffer distance |
|---|---|---|---|
| 1xM1/M2 | 1x | 250ps | 100nm |
| 1.5xM1/M2 | 1.5xM1/M2 | 192,5ps | 150nm |
| 1*M3/M4 | 2xM1/M2 | 125ps | 200nm |
| 1.5*M3/M4 | 3xM1/M2 | 101,2ps | 300nm |
| 1*M5/M6 | 4xM1/M2 | 67,5ps | 400nm |
| 1.5*M5/M6 | 6xM1/M2 | 41,6ps | 600nm |
| 1*M7/M8 | 8xM1/M2 | 33,75ps | 800nm |
| 1.5*M7/M8 | 12xM1/M2 | 20,83ps | 1200nm |

OPTIMIZING ROUTING OF A SIGNAL PATH IN A SEMICONDUCTOR DEVICE

BACKGROUND

The invention relates generally to a method for optimizing a routing of a signal path in a semiconductor device, and more specifically, to an optimization in terms of delay and signal integrity in a semiconductor device. The invention relates further to a related system for optimizing a routing of a signal path, and a computer program product.

Currently, at the end of an implementation phase (also called Engineering Changed Order phase) of macros/rows/units/course/chips one may have created an unrouteable netlist of routed netlists in which additional nets have to be implemented. In many times, these netlists have critical and uncritical nets, and during the implementation process annotations or tags of some of the nets are changed from critical to uncritical with respect to timing or signal integrity. But when these annotations have been changed they still use the same wire resources they needed at the beginning. To find additional wire resources in this phase of implementation, a work intensive manual process is necessary to take down uncritical and critical nets to find free resources (e.g., space for other wires) for new critical nets. In some cases, it is helpful to move buffers to other locations resulting in moving affected wires, too. However, the process starts with a selection of uncritical nets, a generation of a list of these nets, and taking down the used metal layer of these nets based on the available timing resources. Next, deleting the wiring and buffering follows before a re-run of a global routing process is performed. The so generated new nets have to be enhanced with the required buffers and then the detailed routing process has to be performed. When the routing is done, the netlist has to be extracted and atomic calculation on the extracted netlist is needed. This time-consuming, manual, iterative process is required multiple times, and in some cases, some nets have to be set to their original metal layer assignment in metal width because they do not have enough timing resources to be tagged down. Thus, such manual process may be a waste of time; it may increase the design layout process efforts and, thus effect the economic calculation negatively.

SUMMARY

According to one or more aspects of the present invention, a method is provided for optimizing a routing of a signal path in terms of delay and signal integrity in a semiconductor device. The signal path may include at least one track in a metal layer of the semiconductor device. The method may include selecting an already routed original signal path to be optimized, and modifying at least one original routing parameter value related to the original signal path, wherein a routing parameter characterizes a resource allocation rule used by a routing algorithm. The modified routing parameter value may lead to less wiring resource consumption than the original routing parameter. The method may additionally include creating an alternative signal path based on the modified routing parameter value; determining at least one timing value describing the delay and signal integrity of the alternative signal path; and replacing the already routed original signal path by the alternative signal path based on the timing value indicating that the alternative signal path complies with predefined constraints related to the delay and signal integrity.

Systems and computer program products relating to one or more aspects are also described and claimed herein.

Additional features and advantages are realized through the techniques described herein. Other embodiments and aspects are described in detail herein, and may be considered a part of the claimed aspects.

BRIEF DESCRIPTION OF THE DRAWINGS

It should be noted that embodiments of the invention are described with reference to different subject-matters. In particular, some embodiments are described with reference to method type claims whereas other embodiments are described with reference to apparatus or system type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the system type claims, or the computer program product type claims, is considered as to be disclosed within this document.

The aspects defined above and further aspects of the present invention are apparent from the examples of embodiments described hereinafter and are explained with reference to the examples of embodiments, but to which the invention is not limited.

Figure 1:
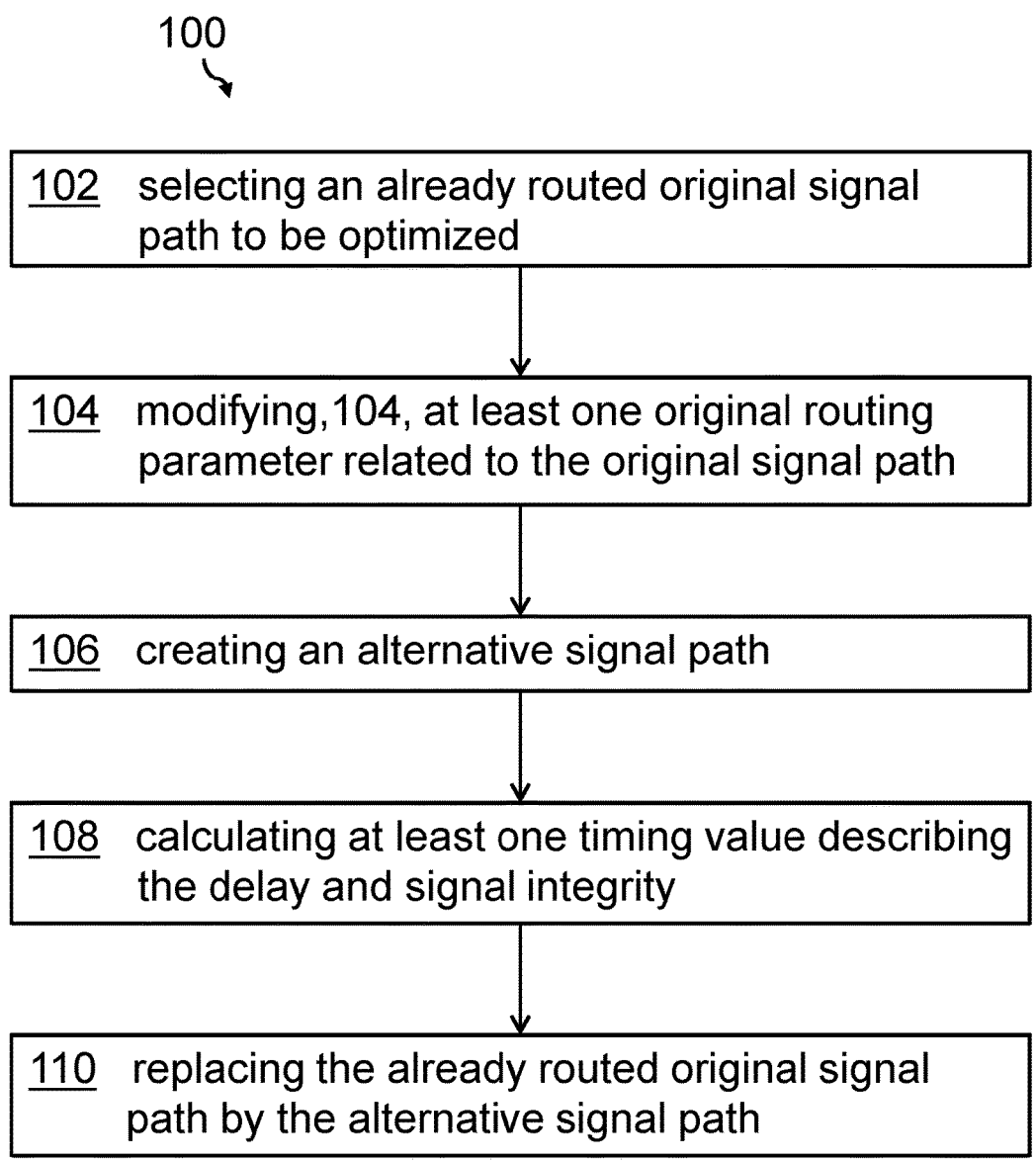
Figure 2:
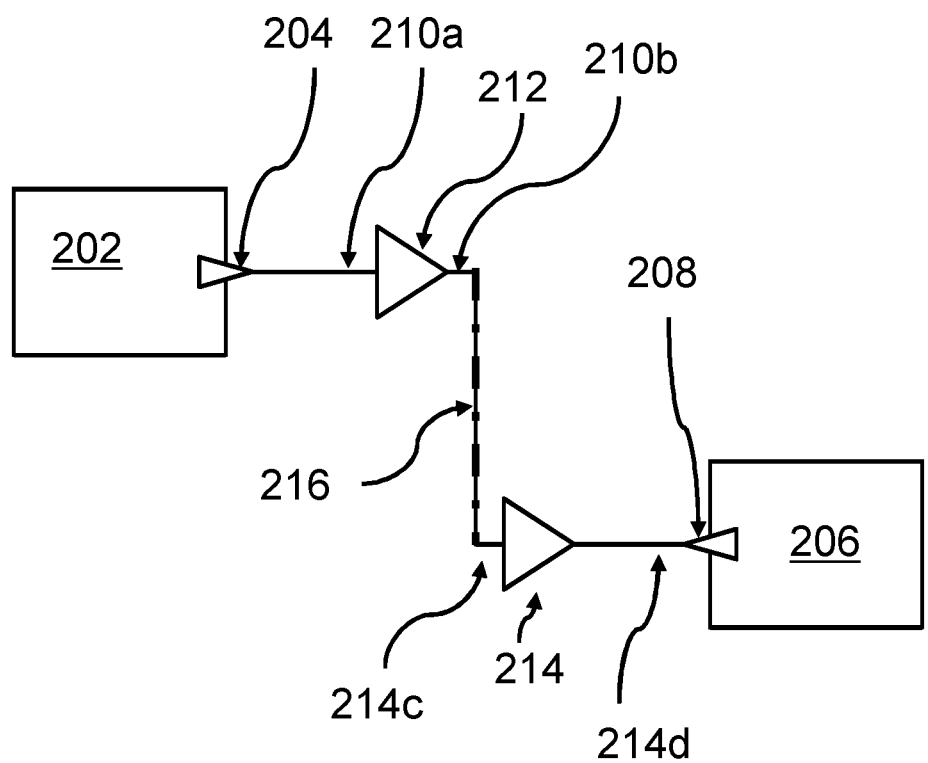
Figure 3:
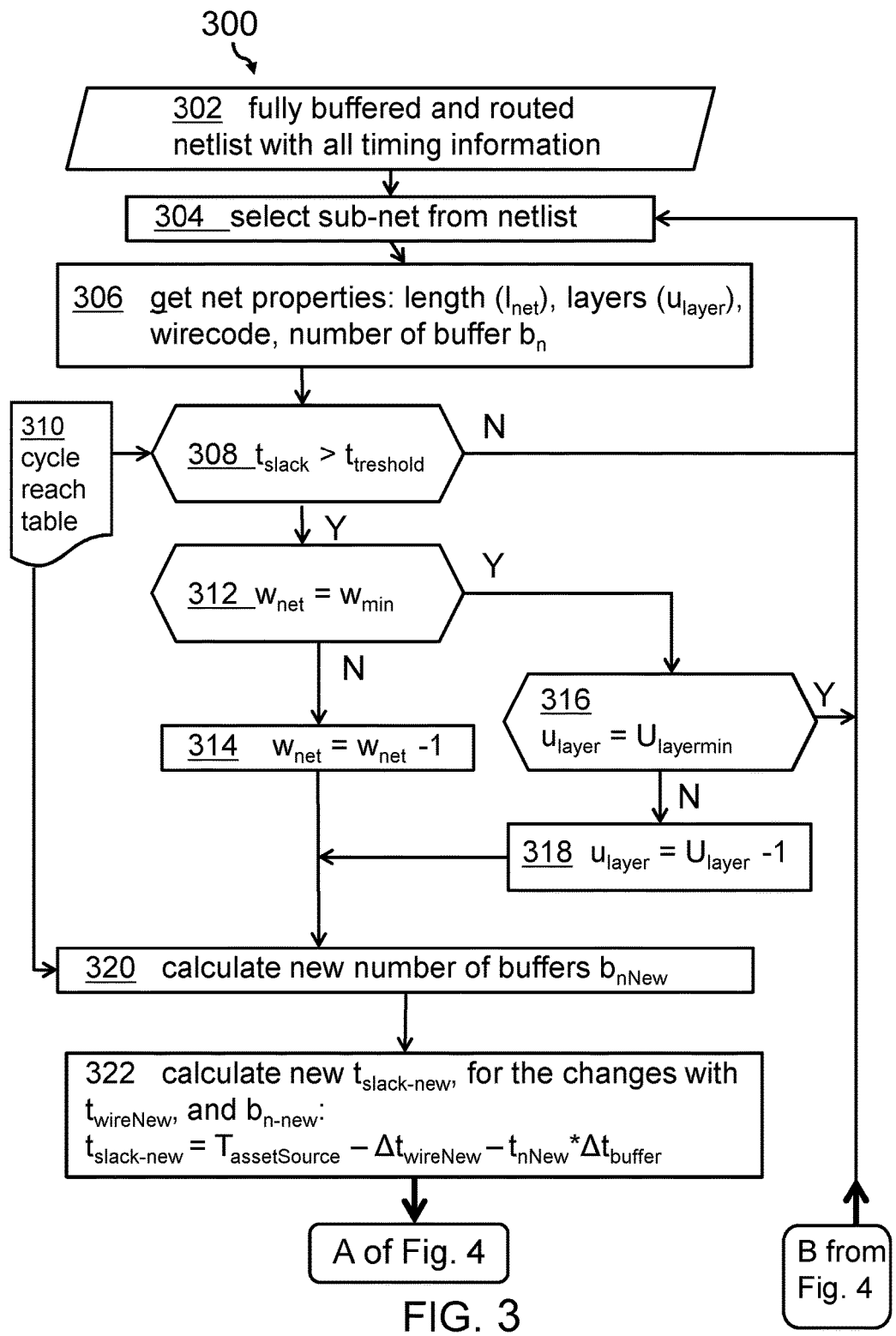
Figure 4:
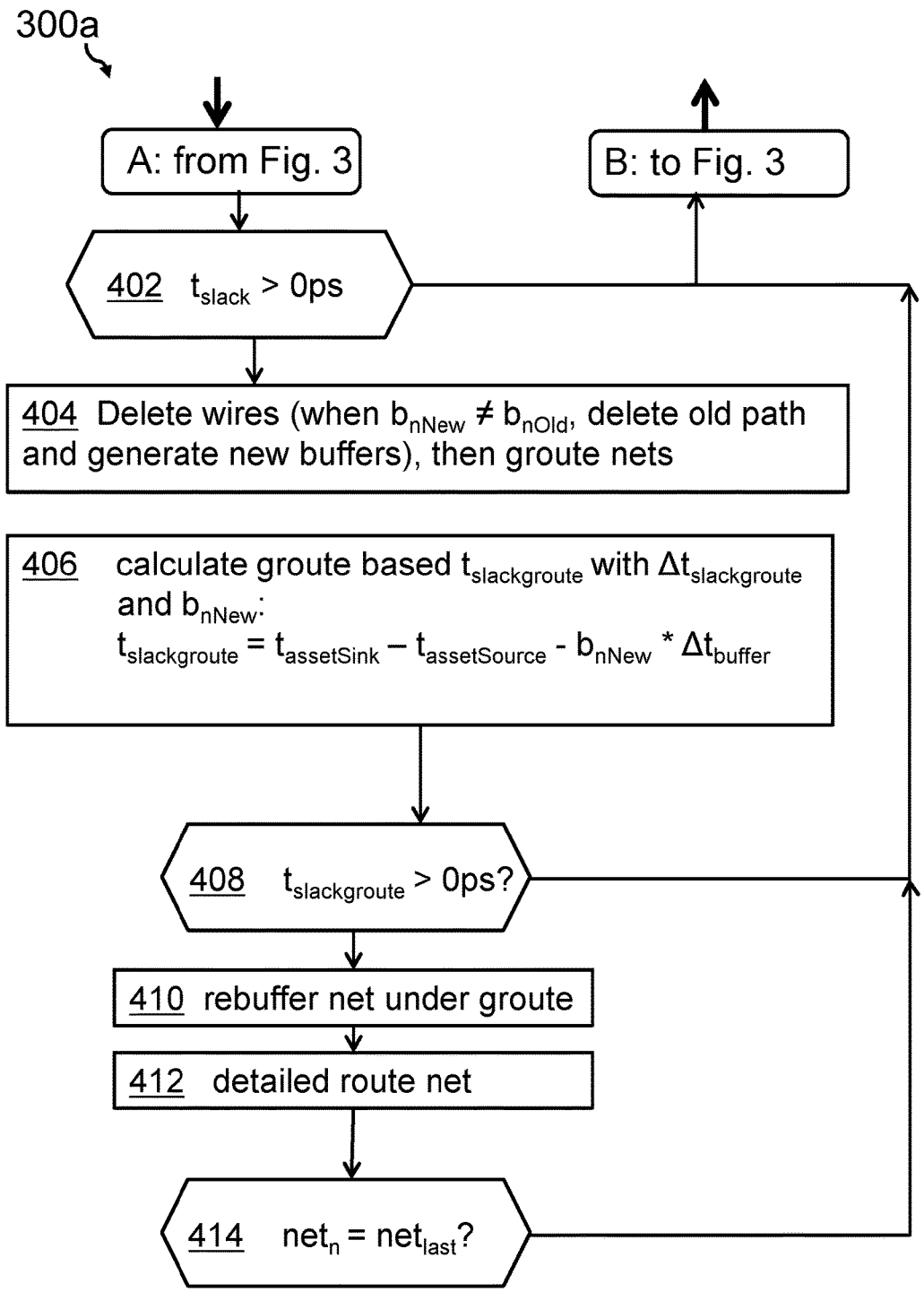
Figure 6:
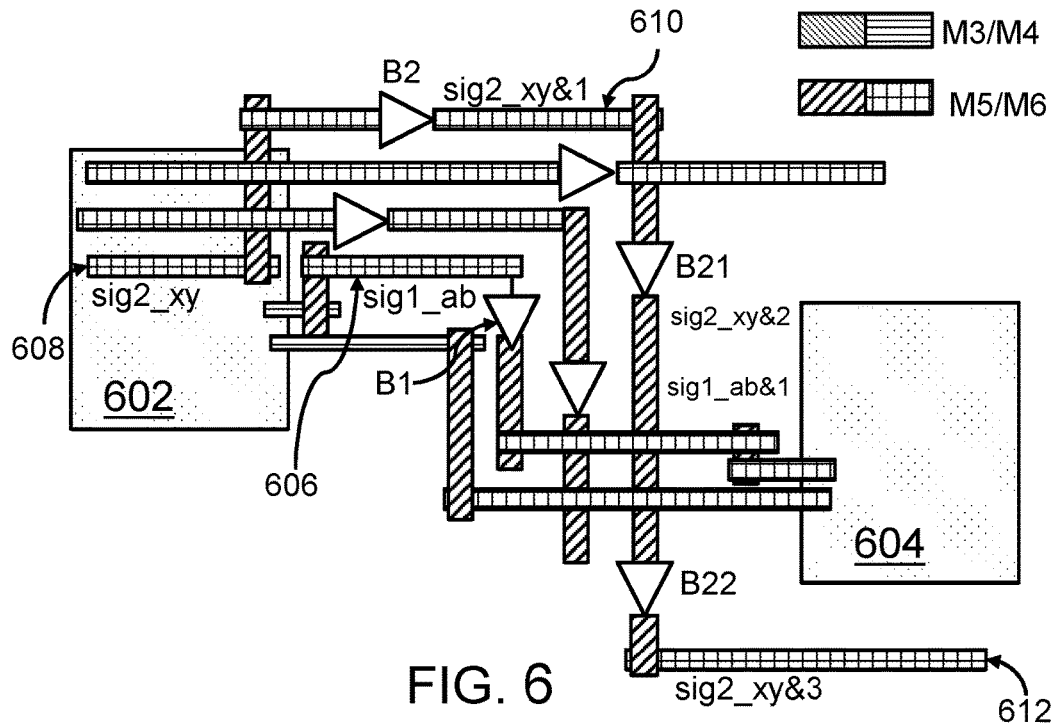
Figure 7:
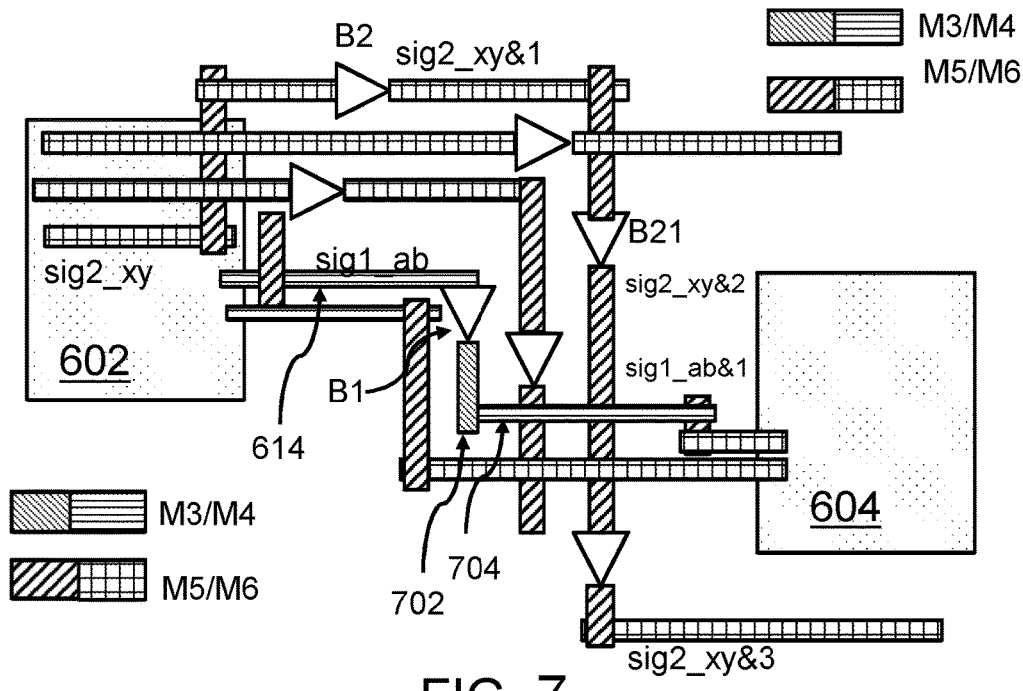
Figure 8:
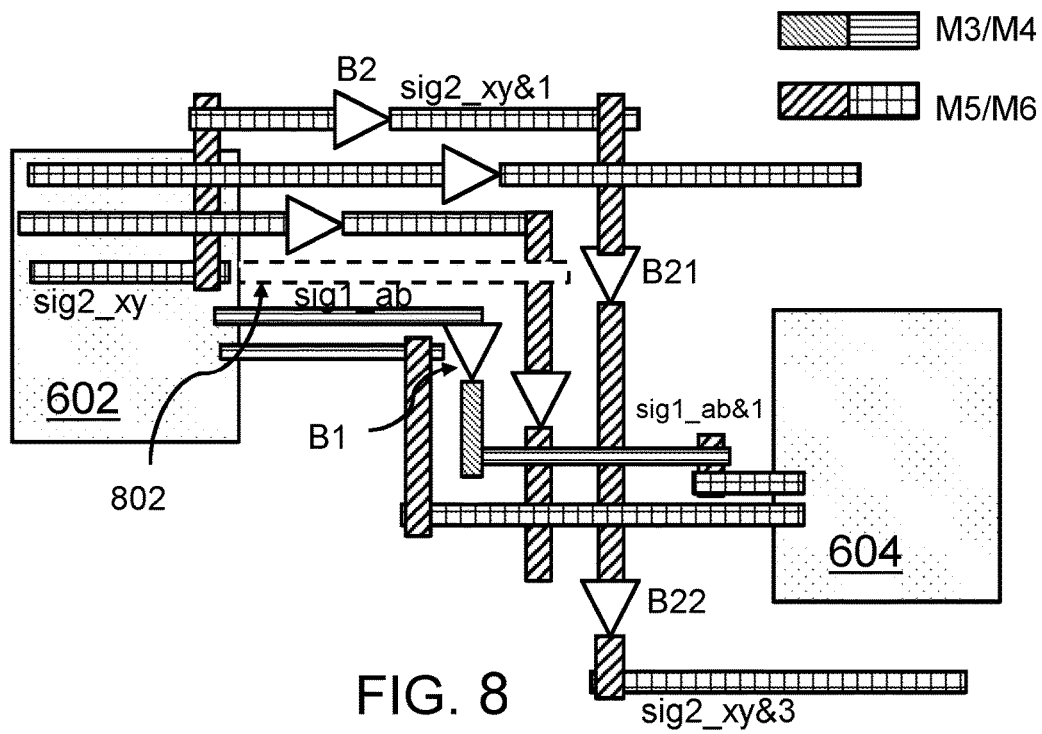
Figure 9:
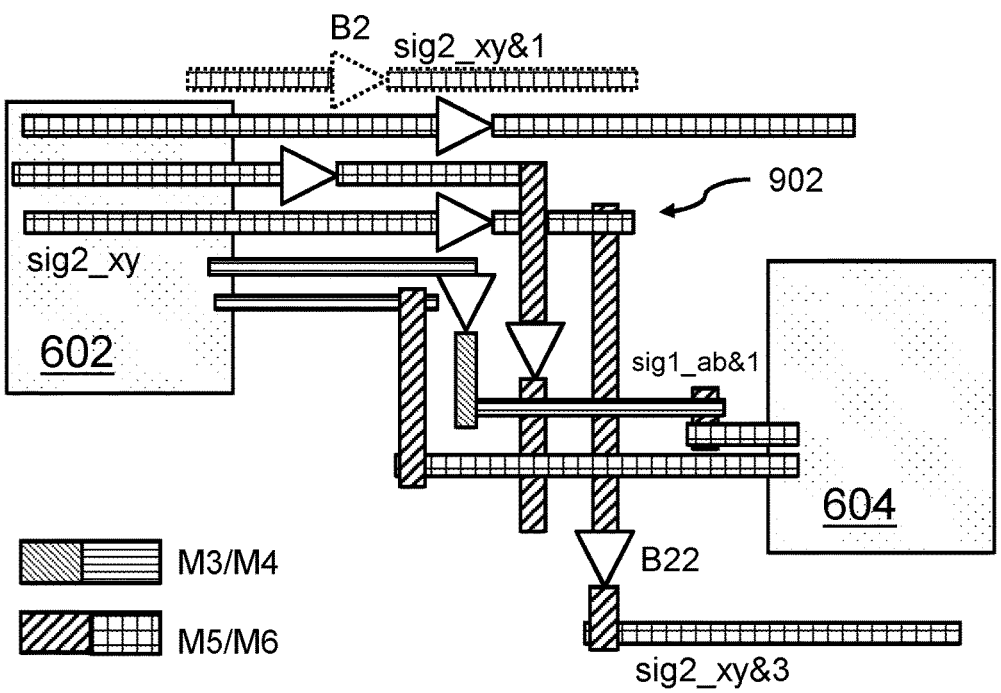
Figure 10:
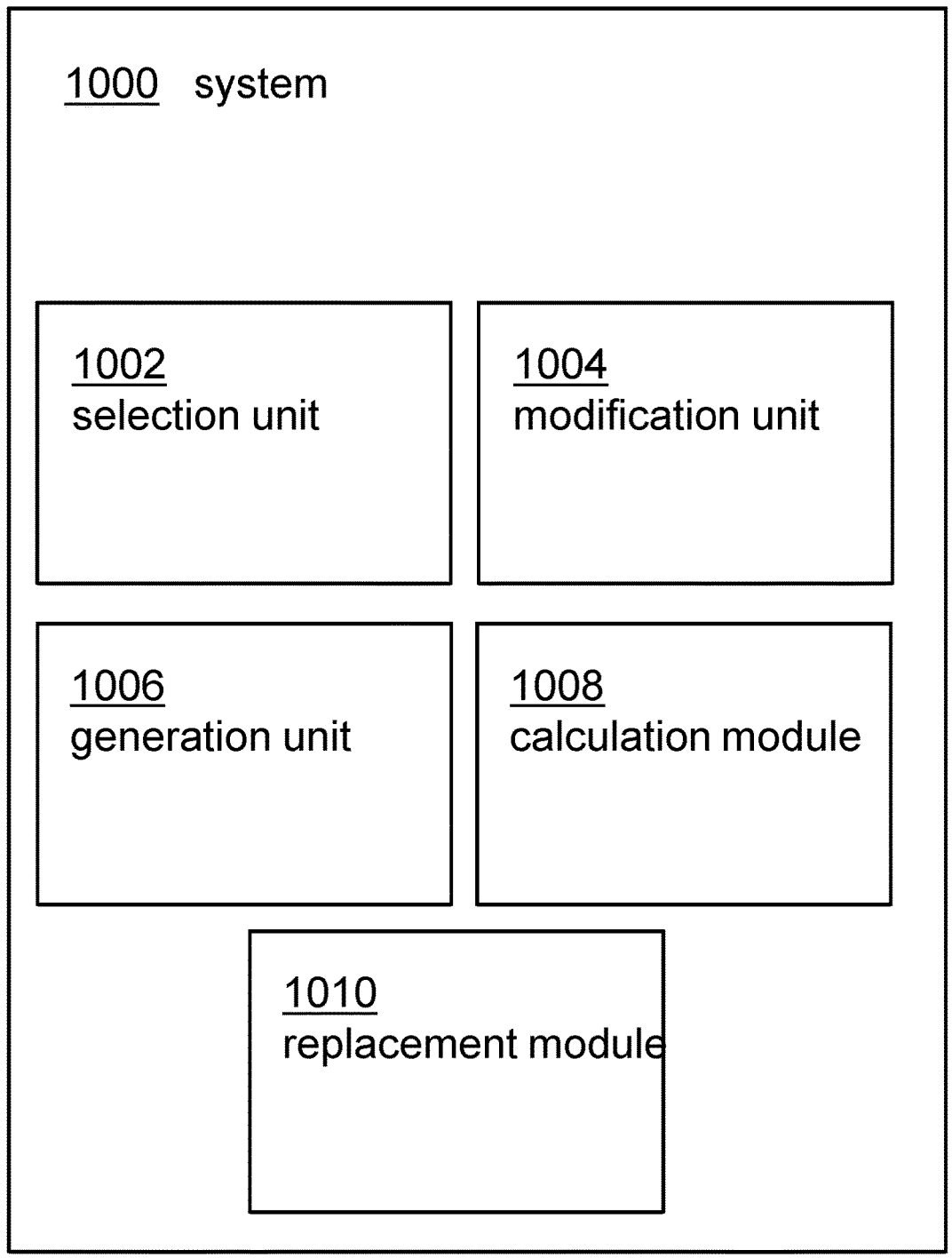
Figure 11:
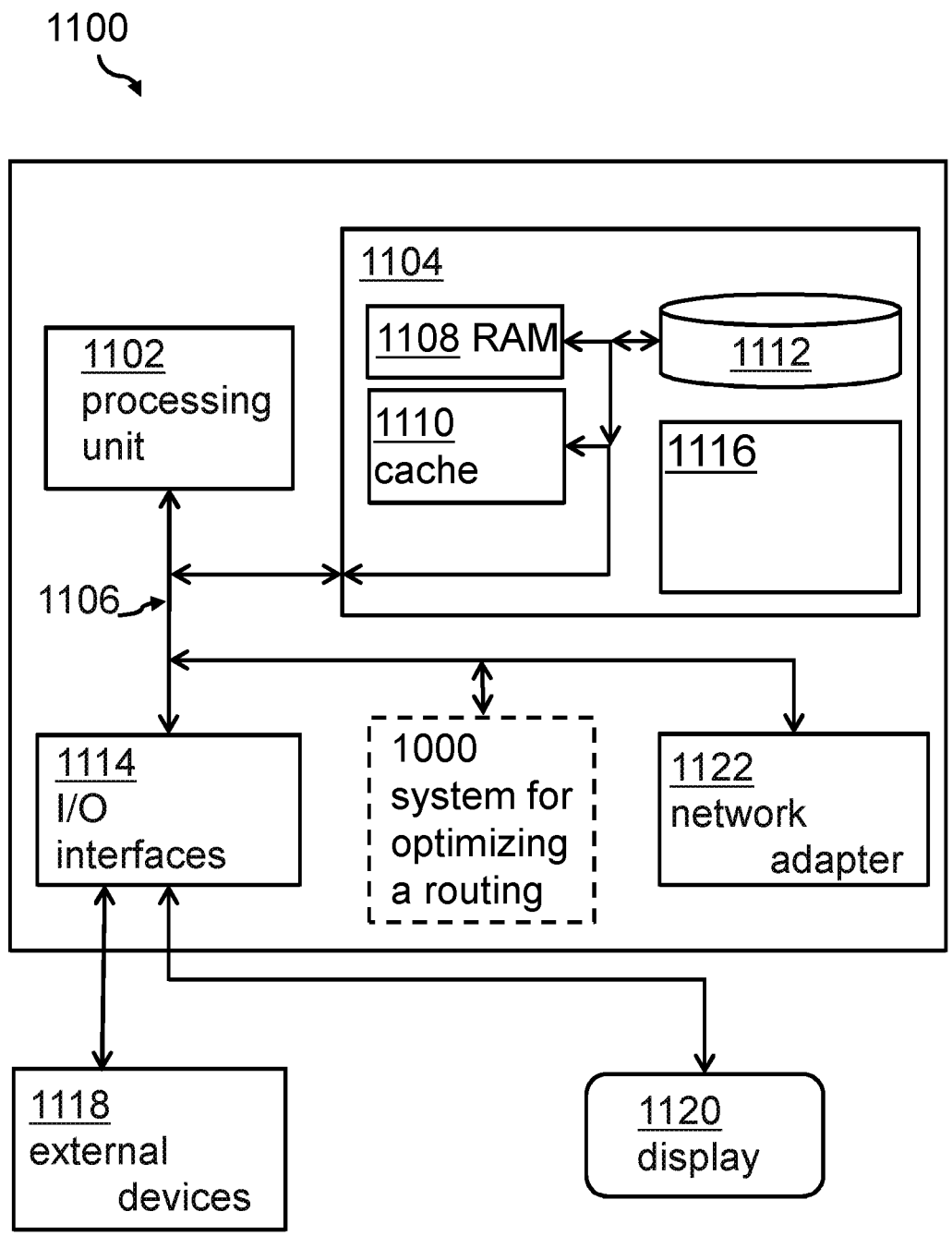

Embodiments of the invention are described below, by way of example only, and with reference to the drawings, in which:

FIG. 1 shows a block diagram of one embodiment of a process for optimizing a routing of a signal path, in accordance with one or more aspects of the present invention;

FIG. 2 illustrates the concept of a Steiner length, used in accordance with one or more aspects of the present invention;

FIG. 3 shows a block diagram of a first half of a more detailed process, in accordance with one or more aspects of the present invention;

FIG. 4 shows a block diagram of a second half of a more detailed process, in accordance with one or more aspects of the present invention;

FIG. 5 shows an exemplary embodiment of a cycle reach table, used in accordance with one or more aspects of the present invention;

FIG. 6 shows an exemplary wiring between a source and a sink as an exemplary starting point for processing, in accordance with one or more aspects of the present invention;

FIG. 7 shows a block diagram of the wiring of FIG. 6 with a removed wire and adapted wiring, in accordance with one or more aspects of the present invention;

FIG. 8 shows a block diagram of the wiring of FIG. 6 highlighting the freed-up resource/space, in accordance with one or more aspects of the present invention;

FIG. 9 shows a block diagram of the wiring of FIG. 6 highlighting the new wiring and tagged down wiring, in accordance with one or more aspects of the present invention;

FIG. 10 shows a block diagram of an embodiment of the system 1000 for optimizing a routing of a signal path, in accordance with one or more aspects of the present invention; and FIG. 11 shows a block diagram of an embodiment of a computer system with an integrated system for optimizing a routing of a signal path, in accordance with one or more aspects of the present invention.

DETAILED DESCRIPTION

In the context of this description, the following conventions, terms and/or expressions may be used:

The term 'signal path' may denote a way or track of a signal that travels from a signal source to a signal sink in the semiconductor device. It may include conducting tracks of wires in one or more different metal layers including vias between the metal layers as well as buffers that may be included in the wiring, potentially to overcome the reach of the signal of a specific wire.

The term 'semiconductor device' may denote an integrated circuit to fulfill a predefined function. By way of example, the semiconductor device and the related integrated circuit may be a digital circuit. The semiconductor device may be a multi-layer integrated circuit including a plurality of different active and passive semiconductor layers, as well as isolating and conducting layers, all comprising active and/or passive functional elements.

The term 'track' may denote a conductive path of a metal wiring layer for connecting signal sources and signal sinks of the integrated circuit. The track may also be denoted as wire.

The term 'already routed original signal path' may denote a starting point for the application of the processes disclosed herein. Routing may be understood as the process of selecting best paths in a network, here the connection network with the integrated circuit.

The term 'routing parameter' may denote physical value for describing design options for a connection between a signal source and a signal sink in an integrated circuit. It may relate to the chosen metal layer, the track length, the track width, the track minimum distance (to another track), the location of a buffer, the number of buffers in a connection, the x and y coordinates of the tracks, etc., basically all variables describing the physical connection from a signal source to a signal sink. In embodiments described herein, a routing parameter may be modified in order to optimize a signal path. For example, a routing parameter describing a layer, in particular a metal layer, where a track shall be routed may be modified. Modifying the routing parameter describing the layer is herein also referred to as "down-tagging" or "downgrading". In examples shown herein, the metal layers of a chip are numbered beginning with the metal layer that is located the closest to transistors of the chip. In an embodiment, "down-tagging" or downgrading may thus result in moving the respective tracks to a lower layer, i.e. to a layer that is closer to the transistors.

The term 'resource allocation rule' may denote rules and guidelines for the routing algorithm according to which the algorithm allocates resources in form of space, wires, buffers, wire width and length, etc. The resource allocation rule may allow for certain flexibility in dealing with the underlying physical constraints in that not fixed predefined parameters are preset but ranges of parameter values that may satisfy the underlying physical boundaries.

The term 'alternative signal path' may denote a wiring between a signal source and a signal sink that differentiates in the way the wire or track is laid out. The alternative signal path may also include more or less buffers if compared to the original signal path.

The term 'predefined constraints' may denote, for example, timing, signal reach length of the signal on a wire in a related wiring layer, capacitance of a wire, a noise ratio, and so on. An integrated circuit may be specified for predefined operating ranges. The predefined constraints have to reflect these operating ranges in terms of frequency, temperature and/or noise ratio, just to name a few.

It may also be noted that the method may be applied at the end of the semiconductor device design process in a fully routed and timed netlist. Related technologies may use other methods in much earlier stages of the design process. However, they do not show comparable results.

The proposed method for optimizing a routing of a signal path in terms of delay and signal integrity in a semiconductor device may offer multiple advantages and technical effects:

Chip design and layout is a complex task involving many steps and requiring many compromises in term of signal timing across many parallel signal flows. Up to now it is tried to avoid constraints on the signal timing between partial devices of the semiconductor chip as early as possible in the design process. Thereby, design teams are always keen of avoiding signal paths having a negative slack, i.e., the signals may arrive at their targets/signal sinks too late so that the semiconductor device may not function at all. Sometimes signal paths are designed having a "too positive" slack, i.e., the signals on such a path may be optimized by, e.g., choosing another metal wiring layer with a slower signal travel time or eliminate a buffer no longer required. Thus, valuable space—i.e., resources, on certain metal wiring layers may be freed up. This space may be used for other signal paths having a negative or critical slack, i.e., it may just even represent a functional device.

Thus, the disclosed method may start with a fully tagged, buffered, routed and timed netlist, i.e., pretty much at the end of the chip development process. One reason may be that a fully tagged, buffered netlist may have over-congested areas which may have routing problems because too many wiring paths use high metal layer resources, i.e., space.

Thus, it may be required that the timing is based on the real net length in the netlist and not based on an estimated net length according to Steiner or Manhattan net lengths. Thus, it may happen that scenic nets or paths—those which are longer than actually required and in particular longer than related Steiner net lengths—with a positive slack are accepted. Because all instantiated device macros, arrays, registers and so on are fully implemented at this stage inside the netlist, it is completely known which metal layer resources are needed by these instances. Consequently, it may happen that for a further optimization new or additional wire resources on certain metal wiring layers may be required to implement timing fixes to critical signal paths.

Hence, a downgrading of tracks or wires with positive slacks may generate new wiring resources to minimize net lengths of scenic nets with negative slacks. The proposed method and concept is exactly addressing this challenge. New signal paths in fully routed and congested areas may be designed such that over-congested areas may be scaled down, so that the metal wiring layer resources may be reused for signal paths with critical timings (negative slack). Thus, downgrading wires may free up resources within over-congested areas so that uncritical wires (positive slack) may be routed differently, so that, e.g., a buffer within a critical signal path—and thus additional timing overhead—may be avoided.

Additionally, the disclosed methods may be used for noise reduction by only down-tagging the same metal layer.

According to one embodiment of the method, the modifying the original routing parameter may include changing the metal layer of the track to a metal layer one layer above or one layer below the metal layer related to the original routing parameter. This may give the designer freedom about ways to optimize signal or signal paths slacks. Going one layer below may increase the delay per millimeter wire; going up one metal layer may reduce the delay per millimeter wire. However, the method may choose the right metal layer by its optimization strategy.

According to one optional embodiment of the method, the modifying the original routing parameter may include changing a track width of the metal layer of the track related to the original routing parameter. This degree of freedom may also increase design variables for the chip designer. As known, the width of wires of the metal layer may typically be increased with the number of the wiring layer. Thus, potentially delays may be reduced and the buffer reach length—i.e., the wire length before another buffer may be required—increases. The disclosed method may advantageously make the adaption of the width automatically.

According to an additional embodiment of the method, the track or wire width may be decreased if the track or wire width is greater than a predefined minimum track width of the related layer. Also this may help to reduce used space and congested chip areas and/or over-congested wiring areas. Hence, the method may be enabled to reflect all design parameters for an advanced routing result.

According to one advantageous embodiment of the method, selecting an original signal path may be a function of a slack value—in particular time slack value—of an overall signal delay of the original signal path. This may have the advantage that the overall timing behavior of the signal may be reflected in an end-to-end approach. Such a concept is instrumental in ensuring a proper functioning of the final circuit design.

According to one optional embodiment of the method, the original signal path may connect different sub-units of the semiconductor device with each other. Thus, it may be allowed to optimize also longer wiring distances and signal travel times across multiple sub-units of the chip layout and/or within the netlist. This may allow for a proper reflection of buffers and required and/or potentially eliminate-able scenic net layouts.

In the following, a detailed description of the figures will be given. All instructions in the figures are schematic. Firstly, a block diagram of an embodiment of the inventive method for optimizing a routing of a signal path in terms of delay and signal integrity in a semiconductor device is given. Afterwards, further embodiments, as well as embodiments of the system for optimizing a routing of a signal path in terms of delay and signal integrity in a semiconductor device, will be described.

FIG. 1 shows a block diagram of an embodiment of the method 100 for optimizing a routing of a signal path in terms of delay and signal integrity in a semiconductor device, in particular a highly integrated multi-layer circuit. The signal integrity may, e.g., reflect parameters, like, slew rate, crosstalk, etc. The signal path may include at least one track in a metal layer of the semiconductor device. The method may include selecting, 102, an already routed original signal path to be optimized, in particular at the end of the design process, in a fully routed and timed netlist. The related optimization of the netlist and thus the design of the chip may be directed towards a reduction of required resources on the chip, like wires, space etc.

The method includes further modifying, 104, at least one original routing parameter value related to the original signal path. The routing parameter characterizes a resource allocation rule used by a routing algorithm. This may be done automatically by the disclosed method. The modified routing parameter value leads to less wiring resource consumption than the original routing parameter.

Additionally, the method may include creating, 106, and—also automatically and/or machine supported—an alternative signal path based on the modified routing parameter value, as well as, calculating, 108, at least one timing value describing the delay and signal integrity of the alternative signal path. This may be a check whether the timing value is positive so that it may be ensured that the netlist may represent a functional chip design.

Further, the method may include replacing, 110, the already routed original signal path by the alternative signal path—in particular in the netlist—if the timing value indicated that the alternative signal path complies with predefined constraints related to the delay and signal integrity. This means that the delay value should show a value greater than zero in order to ensure that the chip design may work. A person may know that a delay value below zero may represent a nonfunctional chip design. It basically indicates that a signal arrives too late at a signal sink in order to be handled properly in the overall context of other signals and timings.

FIG. 2 shows the concept of the Steiner length. A pin 204 of an abstract circuit 202 may represent a signal source, e.g. a partial circuit of the integrated semiconductor device. A pin 208 of a second abstract circuit 206 may represent a sink for the signal. In-between the source and the sink, a wire or track is shown comprising portions 210a, 210b, 214c, 214d running in an assumed x-direction and portion 216—which may be made from a different metal (M2) than the other portions (M1). The Steiner length value can be calculated by:

$$L_{net} = |x_{sink} - x_{source}| + |y_{sink} - y_{source}|,$$

assuming that there are no buffers in-between the source and the sink. The related delay without buffers may be calculated by:

$$\Delta t_{Wire} = L_{net} * \Delta t_{Wire(width)/mm}.$$

By way of example, in case the buffers 212, 214 are connected in the way between the source and the sink, the delay can be calculated by:

$$\Delta t_{Wire} = L_{net} * \Delta t_{Wire(width)/mm} + 2 * \Delta t_{buff}.$$

This way, signals between a source and a sink may be adjusted in order to design a chip layout that is actually producible in a functional form.

FIG. 3 shows a block diagram of a first half of a more detailed embodiment of a method, in accordance with one or more aspects of the present invention.

The process solves the tagging down by recalculating the timing with the new resources allocation and also checks if the necessary wire resources are available avoiding an iterative process. All used information is available when the initially routed design is loaded to a final router. The algorithm verifies the netlist for uncritical nets. The algorithm sorts the netlist by used metal layers from bottom to top. Starting from a fully routed, extracted and timed netlist the algorithm gets the current net length (based on the routing), the net properties (wire codes, currently used layers) and the number of buffers. It also gets the current slacks from that net—302, 304, 306.

Then, the current time slack $t_{slack}$ is compared against a threshold value, namely $t_{threshold}$ at 308. It is calculated as:

$$t_{threshold} = \Delta t_{wire(metal\ layer\ related)} + \Delta t_{buffer}.$$

where is $\Delta t_{wire(metal\ layer\ related)} = l_{buffReach(current\ tag-1)} * t_{cycleReach(current\ tag-1)}$.

The cycle reach table 310 may be used as input. Slacks<0 ps are not used as threshold because then there is not enough margin for wire downgrading. Using the wire delay of a layer below the current net based on a cycle reach table in combination with an appropriate, necessary additional buffer delay will result in enough margins for tagging down the wire resources.

If $t_{slack}$ is bigger than $t_{threshold}$, then the algorithm checks first if the width of the current wire can be reduced, 312, 316, 318. If not ("N"), then the next lower metal layer is chosen, 314 ($w_{net}-1$). The new necessary number of buffers for the new metal layer and width is calculated, 320, buffer delays and the wire delay of the total net length are summed up to result as a new total net delay, 322. The process is continued on the flowchart of FIG. 4.

FIG. 4 shows a block diagram of the second half of the more detailed embodiment of 100 (FIG. 1).

If the new net delay $t_{slackNew}$ is positive, then the global routing is run to see if there is a wire solution also with respect to possible over-congestion of the new metal layer, 404. If it is possible to implement a global route (groute) the algorithm also knows the new current net length and calculates a global route based slack $t_{slackgroute}$, 406. If that slack is still positive (compare 408), then it generates, 410 buffers under the groute and closes all opens with a detailed routing step (droute), 412. This is done until all nets are checked and potentially optimized, 414. If not, then the process returns to check whether net delay $t_{slackNew}$ is positive, 402. Otherwise, the process ends.

FIG. 5 shows an exemplary embodiment of a cycle reach table 310. The column 'metal layer' shows examples of different metal types M1, M2, M3, M4, M5, M6, M7 and M8. The metal type may be present in different widths, e.g., 1×, i.e., with factor 1, up to 12×, i.e., with a factor 12 if compared to the '1+M1/M2'-line of the cycle reach table. Correspondingly, delay values Δt/mm are also shown in absolute exemplary values. The related delay may decrease the higher the metal layers is (e.g., from 250 ps to 20.83 ps; not explicitly shown in the table). Furthermore, a maximum buffer distance is shown, indicating the maximum length of a specific wire type without the requirement for including a buffer in order to keep the signal strength above a required minimum value. The disadvantage of including buffers is that additional delays have to be reflected. The different wiring layers 'n' may be counted from top to bottom of the cycle reach table 310.

FIG. 6 shows an exemplary partial chip design as an exemplary starting point. A source circuit 602 and a sink circuit 604 are connected with a series of wires or tracks and buffers in between. Additionally, the metal layers M3/M4 as well as M5/M6 are shown. The different characteristics and parameters of the different metal layers are shown in the cycle reach table example 310 of FIG. 5. The following characteristic parameters of the shown wiring may be assumed as:

$T_{slack(sig1-ab)}=48$ ps
$T_{slack(sig2-xy)}=-8$ ps
$\Delta t_{buffer}=10$ ps

Basically, two signals are investigated in detail: sig1_ab relating to wire line 606 and sig2_xy relating to wire line 608. After buffer B1, the signal sig1_ab becomes sig1_ab&1 indicating that a delay of buffer B1 has to be reflected. The signal is available at wire 610. And, sig2_xy is delayed three times by buffer B2, B21 and B22 before it becomes sig2_xy&3 at wire 612.

The current layout shows a critical signal sig2_xy which has a negative slack of $T_{slack(sig2-xy)}$ of −8 ps. With this negative value the designed circuit would not be functionable. However, by removing one buffer in that signal line it is possible to save 10 ps.

When removing sig1_ab in a way or downgrading it from M5/M6 to 1.5×M3/M4, there will be enough free resources (space) to save 400 μm in the wire length of sig2_xy.

FIG. 7 shows a block diagram of the exemplary partial chip design with a removed wire and adapted wiring, and in particular downgrading sig1_ab from 1×M5/M6 to 1.5×M3/M4 (614). The time slack inside the signal is $t_{slack(sig1\_ab)}=48$ ps, the time slack $t_{slack(sig1\_ab)}=-8$ ps. For the threshold follows $t_{threshold}=\Delta t_{wire(metalLayer\ related)}+\Delta t_{buffer}=27$ ps+10 ps≈37 ps. The wire lengths in the example is 600 μm; on the M5/M6 layers that is equivalent to a wire delay of $t_{bwireM5/6(sig1\_ab)}=40.5$ ps. Rooting 600 μm wire length on 1.5×M3/M4, results in $t_{wire1.5M3/4(sig1\_ab)}=60.72$ ps. The difference of a wiring on a lower metal layer results in $\Delta t_{wireDiff}=20.22$ ps. If an additional buffer is needed, the additional wire delay and an additional buffer delay is 30.22 ps and less than the available slack of $t_{slack(sig1\_ab]}=48$ ps.

It may also be noted that reference numerals 702 and 704 point to the made changes in comparison to FIG. 6, in particular to the new wiring with layer M3/M4.

FIG. 8 shows a block diagram of the exemplary partial chip design highlighting the freed-up resource/space. After downgrading sig1_ab, there are new wire resources on M6, namely the wire 802 which no linger exists—shown as dashed line.

FIG. 9 shows a block diagram of the exemplary partial chip design highlighting the new wiring and tagged down wiring. Here, the new resource (space in layout) to change sig2_xy may be used. The wire through the new free resource saves 400 μm on the additional wire which equals 24.92 ps and one buffer, namely buffer B2, is saved. This is shown in dotted lines in a top area of FIG. 9. The important change has now been made at the crossing contact 902.

According to another aspect of the present invention, a system for optimizing a routing of a signal path in terms of delay and signal integrity in a semiconductor device may be provided. The signal path may include at least one track in a metal layer of the semiconductor device. The system may include a selection unit adapted for selecting an already routed original signal path to be optimized, a modification unit adapted for modifying at least one original routing parameter value related to the original signal path. A routing parameter may characterize a resource allocation rule used by a routing algorithm. The modified routing parameter value may lead to less wiring resource consumption than the original routing parameter.

Additionally, the system may include a generation unit adapted for creating an alternative signal path based on the modified routing parameter, a calculation module adapted for calculating at least one timing value describing the delay and signal integrity of the alternative signal path, and a replacement module adapted for replacing the already routed original signal path by the alternative signal path if the timing value indicated that the alternative signal path complies with predefined constraints related to the delay and signal integrity.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

It may be noted that the semiconductor device may be a highly integrated multi-layer integrated circuit.

FIG. 10 shows a block diagram of an embodiment of the system 1000 for optimizing a routing of a signal path in terms of delay and signal integrity in a semiconductor device.

The signal path includes at least one track in a metal layer of the semiconductor device. The system 1000 includes a selection unit 1002 adapted for selecting an already routed original signal path to be optimized and a modification unit 1004 adapted for modifying at least one original routing parameter value related to the original signal path. A routing parameter characterizes a resource allocation rule used by a routing algorithm. The modified routing parameter value leads to less wiring resource consumption than the original routing parameter.

The system 1000 includes as well a generation unit 1006 adapted for creating an alternative signal path based on the modified routing parameter value and a calculation module 1008 adapted for calculating at least one timing value describing the delay and signal integrity of the alternative signal path. Furthermore, the system 1000 includes a replacement module 1010 adapted for replacing the already routed original signal path by the alternative signal path if the timing value indicated that the alternative signal path complies with predefined constraints related to the delay and signal integrity.

Embodiments of the invention may be implemented together with virtually any type of computer, regardless of the platform being suitable for storing and/or executing program code. FIG. 11 shows, as an example, a computing system 1100 suitable for executing program code related to the proposed method.

The computing system 1100 is only one example of a suitable computer system and is not intended to suggest any limitation as to the scope of use or functionality of embodiments of the invention described herein. Regardless, computer system 1100 is capable of being implemented and/or performing any of the functionality set forth hereinabove. In the computer system 1100, there are components, which are operational with numerous other general purpose or special purpose computing system environments or configurations. Examples of well-known computing systems, environments, and/or configurations that may be suitable for use with computer system/server 1100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1100 may be described in the general context of computer system-executable instructions, such as program modules, being executed by a computer system 1100. Generally, program modules may include routines, programs, objects, components, logic, data structures, and so on that perform particular tasks or implement particular abstract data types. Computer system/server 1100 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 1100 is shown in the form of a general-purpose computing device. The components of computer system/server 1100 may include, but are not limited to, one or more processors or processing units 1102, a system memory 1104, and a bus 1106 that couples various system components including system memory 1104 to the processor 1102. Bus 1106 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1100 typically includes a variety of computer system readable media. Such media may be any available media that is accessible by computer system/server 1100, and it includes both, volatile and non-volatile media, removable and non-removable media.

The system memory 1104 may include computer system readable media in the form of volatile memory, such as random access memory (RAM) 1108 and/or cache memory 1110. Computer system/server 1100 may further include other removable/non-removable, volatile/non-volatile computer system storage media. By way of example only, storage system 1112 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1106 by one or more data media interfaces. As will be further depicted and described below, memory 1104 may include at least one program product having a set (e.g., at least one) of program modules that are configured to carry out the functions of embodiments of the invention.

Program/utility 1114, having a set (at least one) of program modules 1116, may be stored in memory 1104 by way of example, and not limitation, as well as an operating system, one or more application programs, other program modules, and program data. Each of the operating system, one or more application programs, other program modules, and program data or some combination thereof, may include an implementation of a networking environment. Program modules 1116 generally carry out the functions and/or methodologies of embodiments of the invention as described herein.

The computer system/server 1100 may also communicate with one or more external devices 1118 such as a keyboard, a pointing device, a display 1120, etc.; one or more devices that enable a user to interact with computer system/server 1100; and/or any devices (e.g., network card, modem, etc.) that enable computer system/server 1100 to communicate with one or more other computing devices. Such communication can occur via Input/Output (I/O) interfaces 1114. Still yet, computer system/server 1100 may communicate with one or more networks such as a local area network (LAN), a general wide area network (WAN), and/or a public network (e.g., the Internet) via network adapter 1122. As depicted, network adapter 1122 may communicate with the other components of computer system/server 1100 via bus 1106. It should be understood that although not shown, other hardware and/or software components could be used in conjunction with computer system/server 1100. Examples, include, but are not limited to: microcode, device drivers, redundant processing units, external disk drive arrays, RAID systems, tape drives, and data archival storage systems, etc.

Additionally, the system 1000 for optimizing a routing of a signal path in a semiconductor device may be connected to the bus system 1106.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for optimizing a routing of a signal path in terms of delay and signal integrity in a semiconductor device, the signal path including at least one track in a metal layer of the semiconductor device, the method comprising:
   selecting an already routed original signal path to be optimized;
   modifying at least one original routing parameter value related to the original signal path, wherein a routing parameter characterizes a resource allocation rule used by a routing algorithm, and the modified routing parameter value leads to less wiring resource consumption than the original routing parameter;
   creating an alternative signal path based on the modified routing parameter;
   determining at least one timing value describing the delay and signal integrity of the alternative signal path; and
   replacing the already routed original signal path by the alternative signal path based on the timing value indicating that the alternative signal path complies with predefined constraints related to the delay and signal integrity.

2. The method according to claim 1, wherein modifying the original routing parameter comprises changing the metal layer of the track to a metal layer one layer above or one layer below the metal layer related to the original routing parameter.

3. The method according to claim 1, wherein modifying the original routing parameter comprises changing a track width of the metal layer of the track related to the original routing parameter.

4. The method according to claim 3, wherein the track width is decreased if the track width is greater than a predefined minimum track width of the related layer.

5. The method according to claim 1, wherein selecting an original signal path is a function of a slack value of an overall signals delay of the original signal path.

6. The method according to claim 1, wherein the original signal path connects different sub-units of the semiconductor device with each other.

7. A system for optimizing a routing of a signal path in terms of delay and signal integrity in a semiconductor device, the signal path including at least one track in a metal layer of the semiconductor device, the system comprising:
   a memory; and
   a processor communicatively coupled to the memory, wherein the system performs a method comprising:
      selecting an already routed original signal path to be optimized;
      modifying at least one original routing parameter value related to the original signal path, wherein a routing parameter characterizes a resource allocation rule used by a routing algorithm, and the modified routing parameter value leads to less wiring resource consumption than the original routing parameter;
      creating an alternative signal path based on the modified routing parameter;
      determining at least one timing value describing the delay and signal integrity of the alternative signal path; and
      replacing the already routed original signal path by the alternative signal path based on the timing value indicating that the alternative signal path complies with predefined constraints related to the delay and signal integrity.

8. The system according to claim 7, wherein modifying the original routing parameter comprises changing the metal layer of the track to a metal layer one layer above or one layer below the metal layer related to the original routing parameter when modifying the original routing parameter.

9. The system according to claim 7, wherein modifying the original routing parameter comprises changing a track width of the metal layer of the track related to the original routing parameter when modifying the original routing parameter.

10. The system according to claim 9, wherein the track width is decreased if the track width is greater than a predefined minimum track width of the related layer.

11. The system according to claim 7, wherein selecting an original signal path is a function of a slack value of an overall signal delay of the original signal path.

12. The system according to claim 7, wherein the original signal path connects different sub-units of the semiconductor device with each other.

13. A computer program product for optimizing a routing of a signal path in terms of delay and signal integrity in a semiconductor device, the signal path including at least one track in a metal layer of the semiconductor device, the computer program product comprising:
a non-transitory computer readable storage medium having program instructions embodied therewith, the program instructions being executable by one or more computers systems, to cause the one or more computer systems to:
select an already routed original signal path to be optimized;
modify at least one original routing parameter value related to the original signal path, wherein a routing parameter characterizes a resource allocation rule used by a routing algorithm, and the modified routing parameter value leads to less wiring resource consumption than the original routing parameter;
create an alternative signal path based on the modified routing parameter value;
determine at least one timing value describing the delay and signal integrity of the alternative signal path; and
replace the already routed original signal path by the alternative signal path based on the timing value indicating that the alternative signal path complies with predefined constraints related to the delay and signal integrity.

14. The computer program product of claim 13, wherein modifying the original routing parameter comprises changing the metal layer of the track to a metal layer one layer above or one layer below the metal layer related to the original routing parameter.

15. The computer program product of claim 13, wherein modifying the original routing parameter comprises changing a track width of the metal layer of the track related to the original routing parameter.

16. The computer program product of claim 15, wherein the track width is decreased if the track width is greater than a predefined minimum track width of the related layer.

17. The computer program product of claim 13, wherein selecting an original signal path is a function of a slack value of an overall signals delay of the original signal path.

18. The computer program product of claim 13, wherein the original signal path connects different sub-units of the semiconductor device with each other.

* * * * *